Feb. 17, 1953 C. E. ELLIS 2,629,063
ADJUSTABLE POLE PITCH DYNAMOELECTRIC MACHINE
Filed April 27, 1950 3 Sheets-Sheet 1

INVENTOR
CHARLES E. ELLIS
BY
his ATTORNEYS.

INVENTOR
CHARLES E. ELLIS

Patented Feb. 17, 1953

2,629,063

UNITED STATES PATENT OFFICE 2,629,063

ADJUSTABLE POLE PITCH DYNAMO-ELECTRIC MACHINE

Charles E. Ellis, Mahwah, N. J.

Application April 27, 1950, Serial No. 158,492

5 Claims. (Cl. 310—166)

The present invention relates to alternating current dynamoelectric machines and more particularly to a new and improved adjustable speed alternating current motor having good operating characteristics.

Dynamoelectric machines capable of operating as adjustable speed motors are disclosed in prior Patent No. 2,470,767 issued May 24, 1949, to the present applicant. Those machines are based on the novel principle that movement of a concentration of magnetic flux in a straight line along a series of linearly disposed stator pole faces and associated windings, each connected to a corresponding phase of an alternating current source, with said row of pole faces skewed with respect to a movable elongated nonmagnetic conductor, either in the form of a bar or a group of insulated wires, causes the latter to move parallel to itself at an angle to its length as a motor. Variation in the degree of relative skew between the stator pole faces and the conductor varies the speed of movement of the conductor.

In operation, motors of the type described in the above-mentioned patent develop magnetic flux along the axis of rotation as well as transversely of the axis. The armature and field structure, therefore, should be designed to carry both the axial and transverse magnetic fluxes and should be appropriately laminated to avoid excessive iron losses. Such motors, therefore, tend to be heavier than conventional alternating current motors of the same power rating.

The purpose of the present invention is to provide a new and improved adjustable speed alternating current motor which affords all of the advantages of motors of the type disclosed in the above prior patent, but in which substantially all the magnetic flux passes transversely through the rotor, there being substantially no axial flux present. This is accomplished by assembling a plurality of magnetically independent multi-pole structures adjacent one another coaxially of the rotational axis of the machine so as to form at least two rows of poles. The multi-pole structures are mounted for relative displacement with respect to one another so that the positions of the respective fields established thereby with respect to the rotor conductors may be adjusted as desired. By connecting the windings on the several multi-pole structures to the appropriate phases of a polyphase alternating supply, an elliptical or circular rotating magnetic field may be established whose effective speed of rotation is a function of the degree of relative displacement of the multi-pole structures with respect to the rotor conductors. However, the magnetic flux established by the poles of each multi-pole structure oscillates transversely of the rotational axis of the machine without establishing any axial flux component.

It will be understood, therefore, that dynamoelectric machines constructed according to the invention will be lighter than machines of the type disclosed in the above prior patent for the same rating, since no additional iron is needed to carry axial flux. Further, the absence of axial flux eliminates the necessity for special laminations, so that the construction is simpler and less expensive.

The invention may be better understood from the following detailed description of a typical form thereof, taken in conjunction with the accompanying drawings in which:

Fig. 3 is a side view in elevation of one of the two-pole structures used in the motor shown in Figs. 1 and 2;

Figure 1:
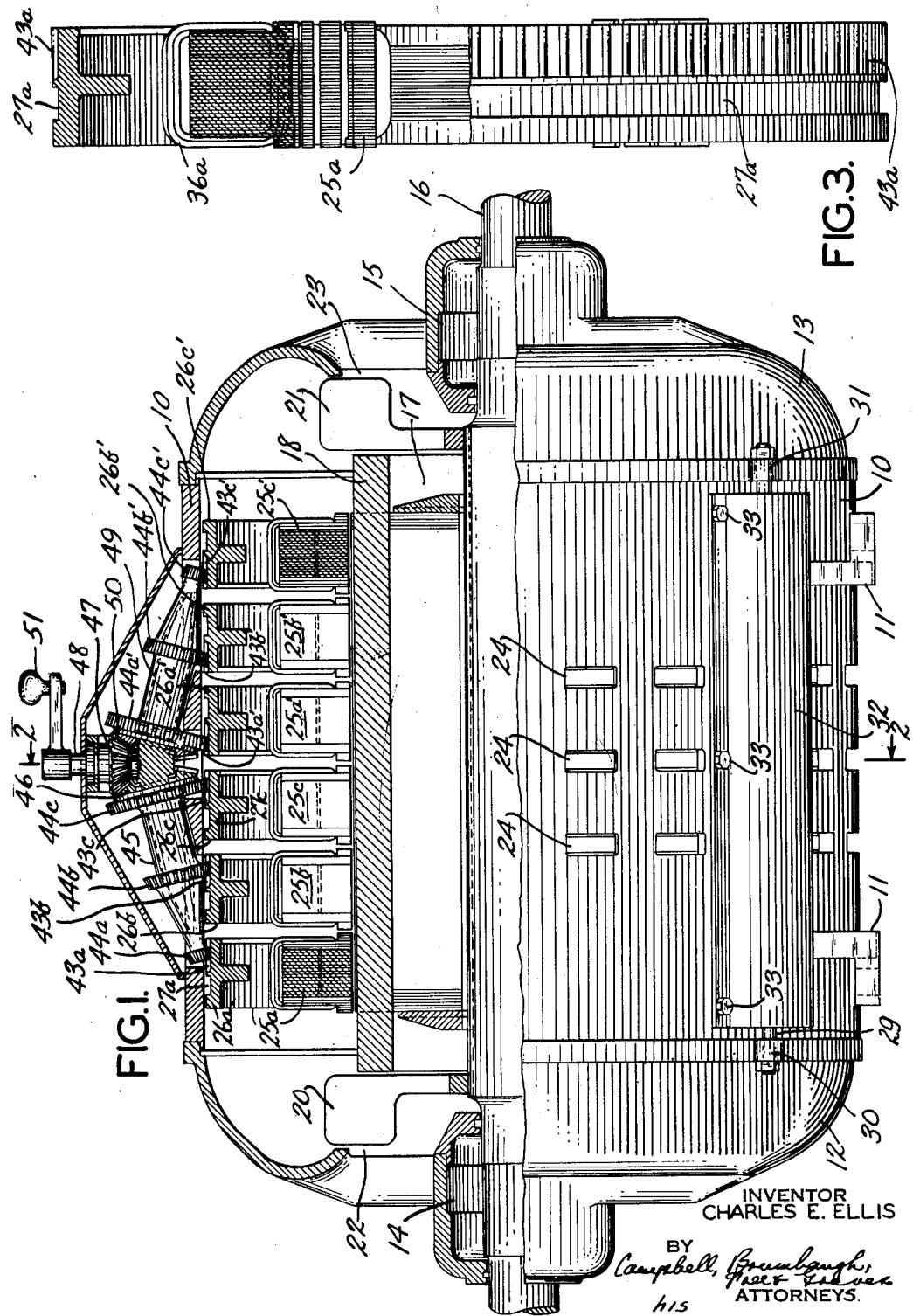
Fig. 1 is a side view in elevation, partly in section taken along line 1—1 of Fig. 2 of a polyphase alternating current motor constructed according to the invention.

In the form of the invention shown in Fig. 1, the motor comprises a housing 10, preferably made of nonmagnetic material, supported upon suitable base members 11 and having end bells 12 and 13 secured together by throughbolts 29 extending through cooperating bored ears 30 formed on the end bells 12 and 13. The end bells 12 and 13 support conventional bearings 14 and 15 in which is journalled a shaft 16 carrying a rotor 17. The rotor 17 may be a conventional squirrel-cage induction motor rotor comprising a plurality of parallel, skewed conductors 18 embedded in slots 19 (Fig. 2) and insulated throughout their lengths therefrom, although a conventional wound rotor may be employed. The shaft 16 may also carry conventional fan blades 20 and 21 which are adapted to cooperate with openings 22 and 23 formed in the end bells 12 and 13, respectively, and with holes 24 formed in the housing 10 to insure proper ventilation and cooling of the motor.

Mounted within the housing 10 and spaced from the rotor 17 by a very narrow air gap are a plurality of multi-pole structures 25a, 25b, 25c, 25a', 25b', 25c', each comprising two magnetic poles disposed 180° apart, for example. Since these multi-pole structures are identical, it will be necessary to describe only one in detail, and corresponding parts in the others will be designated by corresponding reference numerals with appropriate letters.

Figure 2:
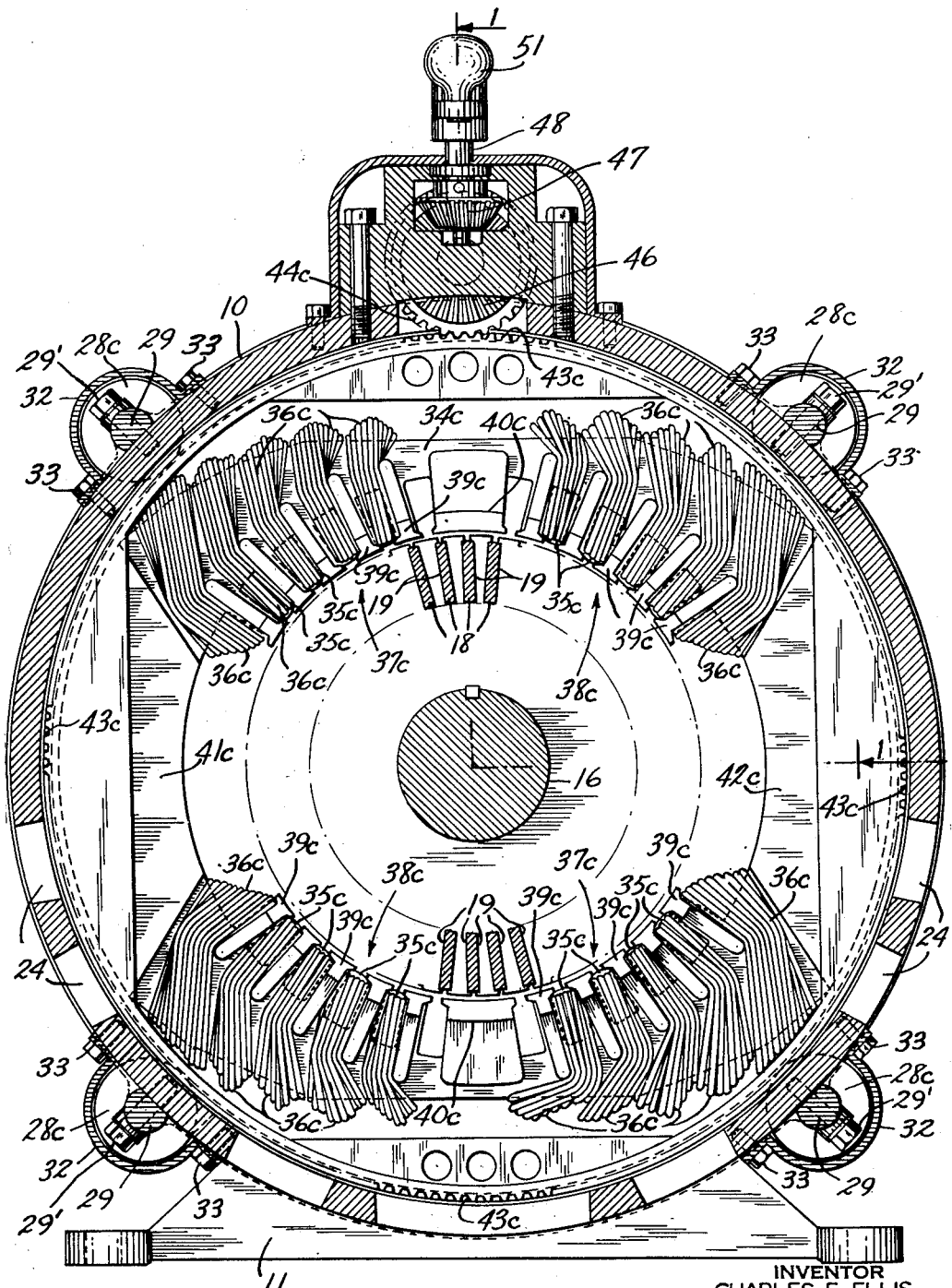
Fig. 2 is a view in transverse section taken along line 2—2 of Fig. 1, looking in the direction of the arrows.

The multi-pole struuture 25c comprises a ring-like member 26c, preferably made of suitable nonmagnetic material, which is mounted in the housing 10 for rotation about the rotational axis of the motor. To this end, it may be provided with an annular recess 27c in the outer face thereof forming a raceway for a plurality of roller bearings 28c (Fig. 2) mounted on the outside of the housing 10. By way of example, four roller bearings 28c located substantially 90° apart are shown in Fig. 2. Each roller bearing 28c may be mounted on a throughbolt 29 which also carries similar roller bearings for the other multi-pole structures shown in Fig. 2. The throughbolts 29 may be secured to the housing 10 by cap screws 29', for example. Preferably, the roller bearings are enclosed within a suitable housing 32 secured to the motor housing 10 in any suitable manner, as by the cap screws 33, for example.

Tightly secured within the ring-like member 26c is a yoke 34c, which may be made of stacked laminations of magnetic material according to good engineering practice. Formed in one side of the yoke 34c are two groups 37c and 38c of coil receiving slots 35c separated by the width of a slot as shown in Fig. 2. Embedded in the slots 35c are a plurality of groups of coils 36c which may be wound around the yoke 34c much in the manner of a Gramme ring winding. The coils 36c comprising the group 37c are connected in series aiding, as are the coils comprising the group 38c. Also, the two groups 37c and 38c are connected in series opposition to one phase of a suitable source of polyphase alternating current, so that the magnetic fluxes produced in the rotor 17 by the coils thereof are in phase.

A plurality of raised, laminated, T-shaped members 39c are preferably mounted on opposite sides of the yoke 34c between adjacent groups of windings 35c. Raised laminated members 40c are also formed on opposite sides of the yoke 34c between the two groups of coils 37c and 38c, while the portions 41c and 42c of the yoke 34c are also raised and made of laminated magnetic material. Preferably, the axial thickness of the members 39c, 40c, 41c and 42c should be approximately the same as the axial distance that the coils 35c extend beyond the face of the yoke 34c.

Similar coil receiving slots 35c and windings 36c are formed in the yoke 34c at a position located substantially 180° away from the magnetic pole construction described above, thus forming two magnetically aiding magnetic poles. It will be understood that if the windings comprising two poles are connected in series to a source of alternating current, an oscillating magnetic field will be produced therebetween which will cause magnetic flux to pass through the rotor 17. By virtue of the coil winding arrangement shown, the flux distribution will be a stepped wave approximating a sine wave, the peak value occurring along the median line extending through the two poles.

The windings on the multi-pole structures 25a, 25b and 25c may be connected to the phases A, B and C, respectively, of a polyphase source of electrical energy (not shown), the windings on the multi-pole structures 25a', 25b', and 25c', respectively, also being connected to the phases A, B and C of the polyphase source. Hence, when the poles are in axial alignment, a magnetic flux concentration will appear to move continuously along the poles formed on the multi-pole structures 25a, 25b, and 25c, and a corresponding flux concentration will appear to move along the poles formed on the multi-pole structures 25a', 25b', and 25c'.

Speed control of the motor is attained, according to the invention, by adjusting the pitch between the poles of the several multi-pole structures. This may be accomplished, for example, by forming external ring gears 43a, 43b, 43c, 43a', 43b' and 43c' on the corresponding ring-like members of the two-pole structures shown in Fig. 1. The ring gears 43a, 43b and 43c are adapted to be driven by corresponding bevel gears 44a, 44b and 44c of progressively greater diameter mounted on a shaft 45 carrying a beveled gear 46 driven by a gear 47 on a shaft 48. Similarly, the gears 43c', 43b' and 43a' are adapted to be driven in the opposite direction by corresponding bevel gears 44c', 44b' and 44a' of progressively greater diameter mounted on a shaft 49 carrying a bevel gear 50, which is also adapted to be driven by the gearing 47 on the shaft 48. The shaft 48 may be provided with a suitable handle 51 by means of which it may be rotated to cause the pitches between adjacent poles to be adjusted as required to secure the desired speed of rotation for the motor.

It will be apparent from Fig. 1 that the two innermost ring-like members 26c and 26a' will receive the greatest displacement for any given rotation of the handle 51, whereas the endmost ring-like members 26a and 26c' receive the shortest displacement. Accordingly, movement of the handle 51 results in adjusting the pitches of the adjacent pole structures so as to form two oppositely skewed rows of poles, the ring-like members 26a, 26b and 26c comprising one row and the ring-like members 26a', 26b' and 26c' constituting the other row.

In operation, the handle 51 is normally in the starting position with the pairs of poles carried by the several ring-like members 26a, 26b, 26c, 26a', 26b' and 26c' in axial alignment. In this position, the total voltage induced in the conductors 18 is zero, since the windings on the multipole structures 25a and 25a', 25b and 25b', and 25c and 25c' are energized from the phases A, B and C of a three phase source. Accordingly, in this position the motor is at rest. As the handle 51 is rotated from the starting position, each axial row of poles is divided into two rows which are skewed in opposite directions with respect to one another. Under these conditions each row of poles produces an elliptical rotating magnetic field which induces currents in the rotor conductors 18 and causes the rotor 17 to rotate at a speed that is a function of the effective field rotational velocity, as determined by the space angular pitch between successive phases and the inductive response of the rotor conductors.

It will be understood, therefore, that the invention provides a highly effective variable speed alternating current motor of the type described in the above-mentioned patent which can be lighter and simpler in construction for the same power rating. By using a plurality of multi-pole structures as described above, only oscillating magnetic flux traversing the rotor is established, and no axial magnetic flux is present so that there is no need for additional iron or special laminations to carry such axial flux.

Obviously, the phase voltages applied to the windings on the respective poles may follow any desired phase sequence going from one end of the machine to the other, provided that the gearing for adjusting the pole pitch of the several pole structures is suitably designed to position them in progressive rotational sequence so that an elliptical rotating magnetic field will be produced, as required for motoring action.

Figure 4:
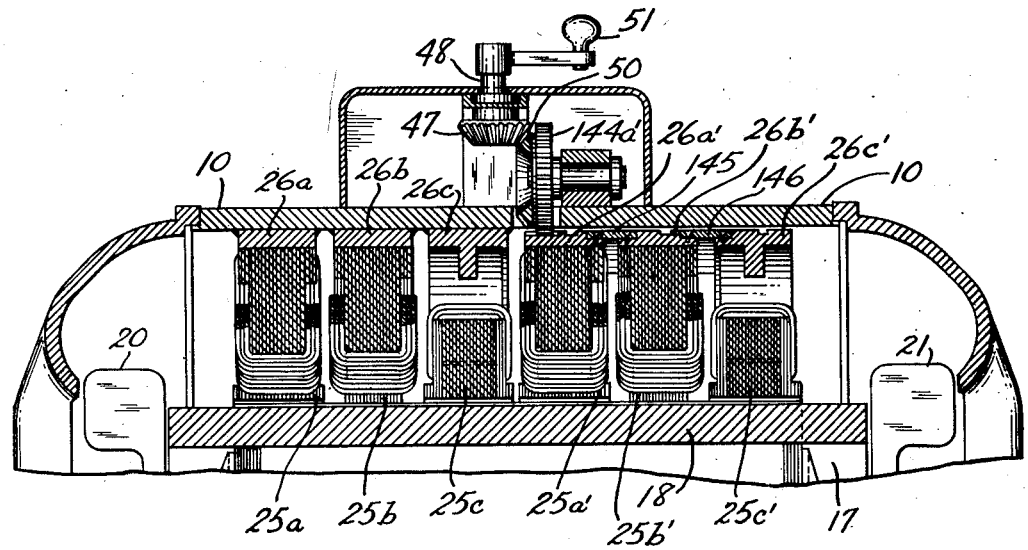
Fig. 4 is a partial view in axial section of another embodiment.

Effective variable speed motor operation can also be achieved by securing the ring-like members 26a, 26b and 26c within the housing 10 so that the magnetic fields established thereby are located apart 120° in space, as shown in Fig. 4. In this embodiment, the ring-like members 26a', 26b' and 26c', in the initial zero speed position, are aligned with the ring-like members 26a, 26b and 26 so that the voltages induced in the rotor conductors 18 by the two groups of magnetic fields cancel each other. The ring-like members 26a', 26b' and 26c' may be rigidly secured together by suitable links 145 and 146 and gearing means 144a' similar to that employed in Figs. 1 and 2, may be provided to rotate the assembled ring-like members 26a', 26b' and 26c' equal amounts with respect to the corresponding ring-like members 26a, 26b and 26c. The motor speed is then a function of the relative displacement between the two groups of ring-like members.

It should be noted that the modification shown in Fig. 4 does not change the effective rate of angular rotation of the magnetic field but merely alters the transformation ratio between the stator and rotor windings and hence, the resultant voltage induced in the rotor. At no load, therefore, synchronous speed would obtain at any setting except zero pitch.

Figure 5:
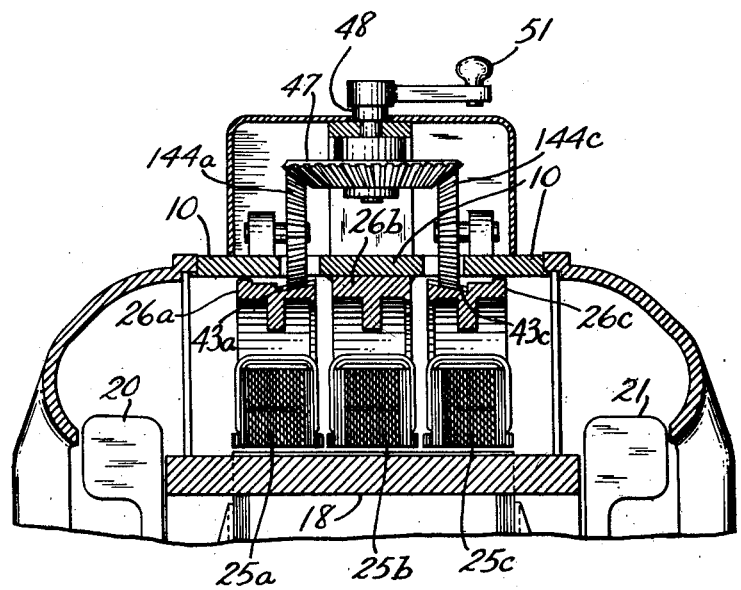
Fig. 5 is a partial view in axial section of a further modification.

It is also possible to secure variable speed operation with only three pole structures such as the three comprising the ring-like members 26a, 26b and 26c in Fig. 5, for example. In such case, the ring-like member 26b might be secured to the housing 10 while the ring-like members 26a and 26c might be mounted for relative rotation in opposite directions with respect to the ring-like member 26b, suitable gearing 144a and 144c being provided for this purpose. Here again, the motor speed will be a function of the relative displacement between the two movable ring-like members 26a and 26c with respect to the fixed ring-like member 26b.

While the specific embodiments described above relate to motors, it will be understood that the several pole structures may be adjusted, manually or by suitable gearing, as required for other purposes than the production of motoring torque, such as motoring torque plus power factor correction, electric braking of connected load, the generation of unbalanced polyphase currents in a connected supply line, or as a frequency changer with wound rotor supplied externally with A. C., for example.

It will be further understood that the specific embodiments described above by way of illustration may be modified within the spirit of the invention. For example, a conventional skein winding might be employed instead of the Gramme ring-type winding disclosed. In such case, there would be only a single winding on each pole, portions of which would be bunched into the coil receiving slots. Also, the ring-like members may all be moved in the same direction relative to the housing, instead of in opposite directions as in Fig. 1, for example. Other modifications in mechanical construction and electrical design will be readily apparent to those skilled in the art. The specific forms of the invention disclosed are not be to be regarded, therefore, as imposing any restriction on the scope of the following claims.

I claim:

1. In a polyphase alternating current dynamo electric machine, the combination of a housing, at least three coaxial ring-like members rotatably mounted in the housing, at least three magnetically independent magnetic members carried by said ring-like members, respectively, and each having at least two cooperating opposed poles separated by an air gap, windings for each of said poles, the windings for cooperating pairs of poles being adapted to be connected to the respective phases of a three-phase alternating current source, a rotor mounted in the housing for rotation between said cooperating poles and spaced therefrom by a narrow air gap, elongated conductors on said rotor, external ring gear means formed on said ring-like members, shaft means carrying gearing adapted to engage the ring gear means on certain of said ring-like members, second shaft means carrying gearing adapted to engage the ring gear means on other of said ring-like members, and manipulatable means coupled to both said shaft means for rotating the same to cause said ring-like members to rotate with respect to one another to adjust the space phases between adjacent pairs of cooperating poles so as to produce a rotating magnetic field about the axis of said rotor.

2. In a polyphase alternating current dynamo electric machine, the combination of a housing, a plurality of roller bearing means mounted in the housing, at least three coaxial ring-like members rotatably mounted in the housing on said roller bearings, at least three magnetically independent magnetic members carried by said ring-like members, respectively, and each having at least two cooperating opposed poles separated by an air gap, windings for each of said poles, the windings for cooperating pairs of poles being adapted to be connected to the respective phases of a three-phase alternating current source, a rotor mounted in the housing for rotation between said cooperating poles and spaced therefrom by a relatively narrow air gap, conductors on said rotor, external ring gear means formed on said ring-like members, shaft means carrying gearing adapted to engage the external ring gear means on certain of said ring-like members, second shaft means carrying gearing adapted to engage the external ring gear means on other of said ring-like members, and actuator means including gearing for rotating said first and second shaft means in opposite directions to cause certain pairs of cooperating poles to move relatively to one another in one direction and other of said pairs of poles to move relatively to one another in the opposite direction to adjust the space phases between the several pairs of cooperating poles so as to produce a rotating magnetic field about the axis of said rotor.

3. In a polyphase alternating current dynamo electric machine, the combination of at least three magnetically independent multi-pole single phase pole structures mounted coaxially in a row for relative rotation about their common axis, windings for each of said pole structures adapted to be connected to the respective phases of a source of three-phase alternating current to produce oscillating magnetic fields in each of said pole structures, the fields in adjacent pole structures being out of time phase with respect to each other, a rotor mounted for rotation between the poles of said pole structures and spaced therefrom by a relatively narrow air gap, conductors on said rotor, and means for simultaneously angularly displacing said pole structures equal amounts relatively to one another about said common axis to adjust the space phases between the magnetic poles on said pole structures so as to produce a rotating magnetic field about the axis of said rotor.

4. In a polyphase alternating current dynamo electric machine, the combination of a first group of at least three coaxial magnetically independent pole structures each comprising a ring-like member having at least two cooperating opposed magnetic poles separated by an air gap, adjacent pairs of poles being angularly disposed with respect to each other, windings on said poles, the windings on cooperating pairs of poles being adapted to be connected to the respective phases of a three-phase alternating current source, a second group of at least three coaxial magnetically independent pole structures each comprising a ring-like member having at least two cooperating opposed magnetic poles separated by an air gap and corresponding, respectively, to the pole structures of said first group, windings for said last named poles, the windings on pairs of cooperating poles being adapted to be connected to the respective phases of a three-phase alternating current source so that corresponding windings in said first and second groups of pole structures are energized in out-of-phase relationship, an elongated conductor mounted between said pairs of poles for relative movement with respect thereto, means for producing relative rotation in one direction between the pole structures of said first group, means for producing relative rotation in the opposite direction between the pole structures of said second group and single actuator means for said two relative rotation producing means.

5. In a polyphase alterating current dynamo electric machine, the combination of at least three magnetically independent ring-like magnetic members disposed coaxially in a row, each of said members having at least two cooperating opposed poles separated by an air gap, windings for said poles, the windings on cooperating pairs of poles being adapted to be connected to the respected phases of a three-phase alternating current source, an elongated conductor mounted between said rows of poles for relative movement with respect thereto, and means for rotating said magnetic members relatively to each other to adjust the space phases therebetween.

CHARLES E. ELLIS.

REFERENCES CITED

The following references are of record in the file of this patent:

UNITED STATES PATENTS

| Number | Name | Date |
|---|---|---|
| 497,113 | Blathy | May 9, 1893 |
| 1,514,474 | Stewart | Nov. 4, 1924 |
| 1,595,550 | Howard | Aug. 10, 1926 |
| 2,151,460 | Bostwick | Mar. 21, 1939 |
| 2,470,767 | Ellis | May 24, 1949 |
| 2,500,365 | Laceulle | Mar. 14, 1950 |

FOREIGN PATENTS

| Number | Country | Date |
|---|---|---|
| 10,970 | Great Britain | of 1910 |
| 430,666 | Great Britain | June 24, 1935 |